US006553331B2

(12) United States Patent
Sakagami

(10) Patent No.: US 6,553,331 B2
(45) Date of Patent: Apr. 22, 2003

(54) WEIGHT CHECKING APPARATUS

(75) Inventor: Yoshiaki Sakagami, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/909,753

(22) Filed: Jul. 23, 2001

(65) Prior Publication Data

US 2002/0019721 A1 Feb. 14, 2002

(30) Foreign Application Priority Data

Aug. 1, 2000 (JP) ........................................ 2000-232618

(51) Int. Cl.⁷ ............................................... G01C 19/03
(52) U.S. Cl. ........................ 702/175; 702/173; 702/101; 177/119; 177/145
(58) Field of Search .............................. 702/175, 173, 702/101; 177/145, 25.11, 119, 253

(56) References Cited

U.S. PATENT DOCUMENTS

| | | | | |
|---|---|---|---|---|
| 5,656,799 A | * | 8/1997 | Ramsden et al. | ............... 177/2 |
| 6,315,199 B1 | * | 11/2001 | Ito et al. | ...................... 235/383 |
| 6,353,192 B1 | * | 3/2002 | Thiel | ........................ 177/25.15 |
| 6,373,001 B1 | * | 4/2002 | Kono et al. | ............... 177/25.18 |

FOREIGN PATENT DOCUMENTS

JP        2807948 B2      10/1998

* cited by examiner

*Primary Examiner*—Bryan Bui
*Assistant Examiner*—Hien Vo
(74) *Attorney, Agent, or Firm*—Shinjyu Global IP Counselors, LLP

(57) ABSTRACT

A weight checking apparatus is provided to prevent items that have not been properly checked from slipping through the weight checker. A weight checker includes a weight conveyor, a loading sensor, a weighing portion, a weighing conveyor weight change monitoring means, an item weight calculation means, and a controller. The loading sensor detects the loading of an item on the weighing conveyor. The weighing portion detects the weight of the weighing conveyor. The controller switches between the weighing conveyor weight change monitoring process and the item weight calculation process based on a detection signal from the loading sensor. The weighing conveyor weight change monitoring process monitors a change in the weight value of the weighing conveyor. The item weight calculation process calculates the weight of the item from the weight value detected by the weighing portion.

17 Claims, 9 Drawing Sheets

WEIGHT CHECKING APPARATUS

BACKGROUND OF THE INVENTION

1. Field of the Invention

The present invention relates to a weight checking apparatus. More specifically, the present invention relates to a weight checking apparatus that calculates the weight of an item on a weighing conveyor by measuring the weight of the weighing conveyor.

2. Background Information

In a production line for food products, a weight checking apparatus for checking the weight of products and screening the products is often placed near the end of the production line. An example of a conventional weight checking apparatus is shown in FIG. 9. A weight checking apparatus 101 shown herein mainly includes a loading conveyor 102, a weighing conveyor 103, an allocating conveyor 104, a weighing portion 105, and a controller 109.

The weighing portion 105 can measure the weight of the weighing conveyor 103. Once products (hereinafter referred to as items) are conveyed to the weighing conveyor 103 from the loading conveyor 102, the controller 109 obtains weight data from the weighing portion 105 while the item is still on the weighing conveyor 103. Then, the controller 109 calculates the weight of the item. Thereafter, the controller 109 performs an allocating process at the allocating conveyor 104 to screen the item based on the calculated weight of the item. In the weight checking apparatus 101, a loading sensor 106 is provided to detect an item that has been loaded onto the weighing conveyor 103 from the loading conveyor 102, as the loading sensor 106 is utilized. The loading sensor 106 is a photoelectric sensor having a pair of projector and light receiver. As the item is loaded from the loading conveyor 102 to the weighing conveyor 103, the loading sensor 106 sends to the controller 109 a signal that indicates that an item has been detected. Then, the controller 109 obtains the weight value of the item when the item is completely loaded on the weighing conveyor 103 and the weight of the weighing portion 105 has become stable. In this manner, the weight checking apparatus 101 obtains the weight values of items sequentially, and screens the items at the allocating conveyor 104 based on their weight values.

In a production line of food products, there are various apparatuses such as a weight checking apparatus, as well as operators who monitor the apparatuses and perform manual operations. Therefore, there is a possibility that an item from outside the production line is loaded on the weight checking apparatus due to a mistake by the operator. In that case, if the item is loaded onto the loading conveyor 102, the item will be weighed at the weighing conveyor 103 and screened out at the allocating conveyor 104. However, if the item is loaded directly onto the weighing conveyor 103, since there is no signal from the loading sensor 106 to the controller 109, the weighing is not performed. Accordingly, the screening is not performed at the allocating conveyor 104. In other words, if the operator inadvertently loads an item from outside the production line onto the weighing conveyor 103, the item may pass through the allocating conveyor 104 as a normal item, and be conveyed to a subsequent process. More specifically, since a weight checking apparatus is often provided at the end of the production line, if an abnormal item passes through the weighing detection apparatus without being screened out, the problem is likely to be a serious one.

In view of the above, there exists a need for a weight checking apparatus which overcomes the above mentioned problems in the prior art. This invention addresses this need in the prior art as well as other needs, which will become apparent to those skilled in the art from this disclosure.

SUMMARY OF THE INVENTION

An object of the present invention is to prevent problems that occur when an item that is not weighed properly passes through weight checking apparatus.

A weight checking apparatus of a first aspect of the present invention includes a weighing conveyor, a loading sensor, weight detection means, weight change monitoring means, weight calculation means, and a controller. The weighing conveyor conveys an item. The loading sensor detects a loading of the item on the weighing conveyor. The weight detection means detects the weight of the weighing conveyor. The weight change monitoring means monitors a change in the weight value detected by the weight detection means. The weight calculation means calculates the weight of the item based on the weight value detected by the weight detection means. The controller switches between a weighing conveyor weight change monitoring process performed by the weight change monitoring means and an item weight calculation process performed by the weight calculation means, based on a detection signal from the loading sensor. The weighing conveyor weight change monitoring process is a control in which the weight change monitoring means monitors the change in the weight value. The item weight calculation process is a control in which the weight calculation means calculates the weight of the item.

Once an item is loaded onto the weighing conveyor of the weight checking apparatus, the loading sensor detects the loading of the item, and sends a detection signal to the controller. The controller switches between the weighing conveyor weight change monitoring process and the item weight calculation process, based on the detection signal from the loading sensor. In other words, in this apparatus, the weighing conveyor weight change monitoring process is performed until the loading of the item onto the weighing conveyor is detected by the loading sensor. When the loading sensor detects the loading of the item onto the weighing conveyor, it is possible to switch to the item weight calculation process. Then, once a period of time necessary to calculate the weight of the item elapses after switching to the item weight calculation process, it is possible to switch back to the weighing conveyor weight change monitoring process.

In this manner, it is possible to perform the weighing conveyor weight change monitoring process, in which a change in the weight value of the weighing conveyor detected by weight detection means is monitored. While the item weight calculation process is performed based on the loading of a normal item onto the weighing conveyor, however, the change is not monitored. Therefore, it is possible to detect as an error a change in the weight value of the weighing conveyor caused by something other than a normal item. For instance, if an item from outside the production line is loaded onto the weighing conveyor due to a mistake of an operator, the change in the weight value of the weighing conveyor is detected during the weighing conveyor weight change monitoring process. Accordingly, an error process such as stopping the apparatus and issuing a warning can be conducted. Weight change monitoring means and weight calculation means can be either included in the controller, or provided separately from the controller.

The weight checking apparatus of a second aspect of the present invention is the weight checking apparatus of the first aspect, further including warning means. The warning means cautions an operator by displaying a screen or issuing a warning. The controller notifies of an abnormality through the warning means when the weighing conveyor weight change monitoring process shows a change in the weight value of the weighing conveyor that exceeds a predetermined range.

When the change in the weight of the weighing conveyor exceeds the predetermined range, the warning means notifies of the abnormality. This is because the warning would be constantly issued if the normal range is not determined, since the weight value usually changes constantly due to the vibration from driving of the weighing conveyor. The weight checking apparatus of a third aspect of the present invention is the weight checking apparatus of either of the previously mentioned aspects, wherein the controller stops the weighing conveyor when the weighing conveyor weight change monitoring process shows a change in the weight value of the weighing conveyor that exceeds a predetermined range. The weight checking apparatus of a fourth aspect of the present invention is the weight checking apparatus of any of the previously mentioned aspects, further including allocating means. The allocating means allocates the item that exits from the weighing conveyor based on the weight of the item calculated by the weight calculation means. The controller sends a predetermined command of abnormality to the allocating means when the weighing conveyor weight change monitoring process shows a change in the weight value of the weighing conveyor that exceeds the predetermined range. When the change in the weight value of the weight conveyor exceeds the predetermined range, it is likely that an item that has not been detected by the loading sensor has been loaded onto the weighing conveyor. Then, in that case, abnormal items that are not normal items tend to be conveyed from the weighing conveyor to the allocating means. Therefore, in this invention, a predetermined command for an abnormal situation is sent from the controller to the allocating means in such cases. In this way, it is possible to distinguish items that have been checked properly from items from the abnormal period. Accordingly, it is possible to perform the subsequent process efficiently. In other words, only the items from the abnormal period can be rechecked later. The predetermined command for the abnormal period is, for instance, a command to allocate the items to a separate location from where normal items are, or a command to allocate such that the items from the abnormal period are excluded from the normal production line along with items of which the weight values are not within the predetermined level.

The weight checking apparatus of a fifth aspect of the present invention is the weight checking apparatus of one of the previously mentioned aspects, wherein the controller switches the weighing conveyor weight change monitoring process to the item weight calculation process in a period between the time when the loading sensor detects the loading of the item onto the weighing conveyor and the time when the item exits the weighing conveyor. In the period between the time when the loading sensor detects the loading of an item onto the weighing conveyor and the time when the item exits the weighing conveyor (hereinafter referred to as normal item conveyance period), the normal item is loaded onto the weighing conveyor. In this period, the weight value of the weighing conveyor changes even though it is during the time period which is not for calculating the weight of the items. Therefore, in this invention, the item weight calculation process is performed instead of the weighing conveyor weight change monitoring process, at least during the normal item conveyance period. In this manner, an allocation command after the proper checking and an allocation command during the abnormal period can be clearly distinguished from each other.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Structure of Weight Checker

Figure 1:
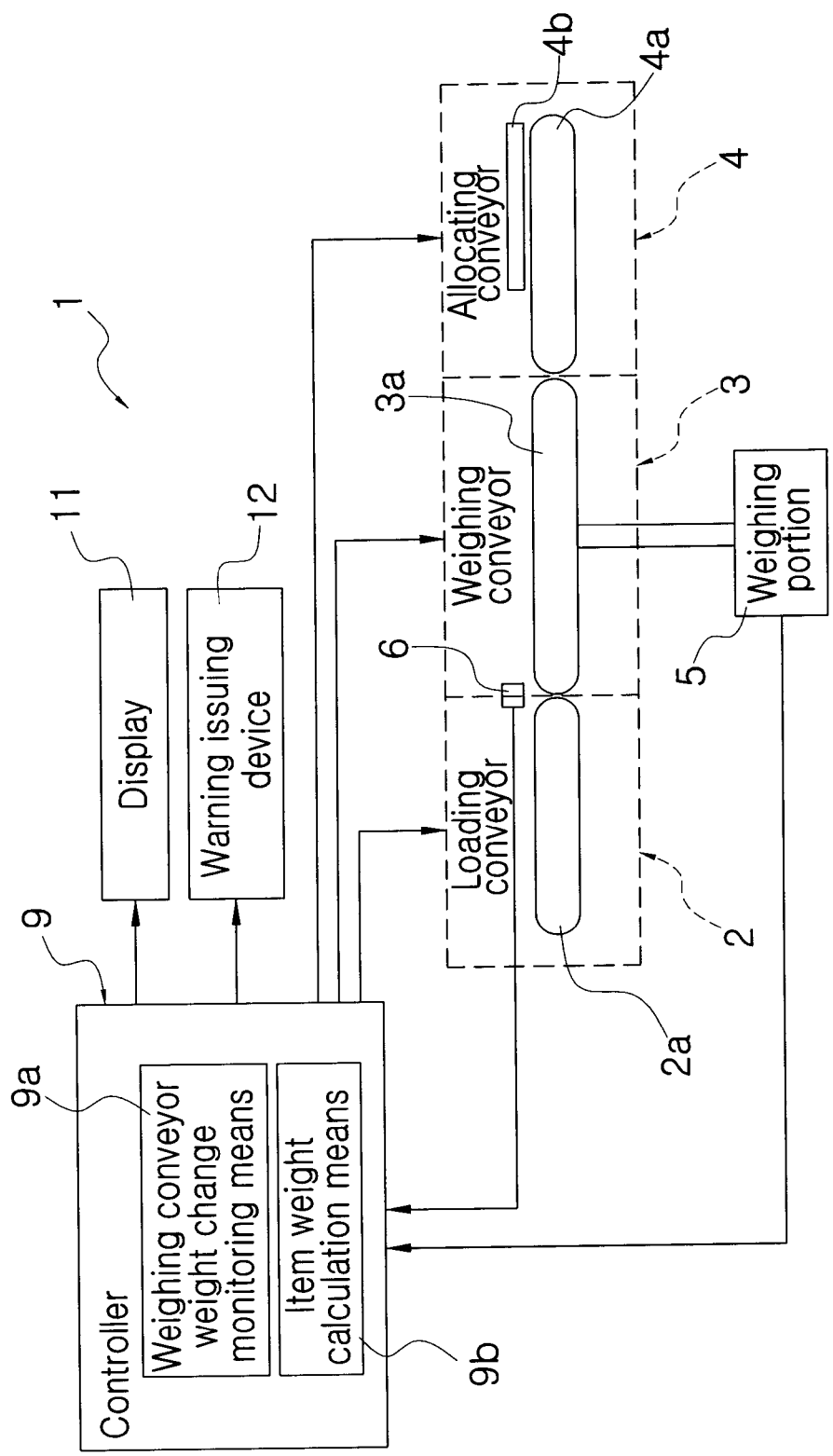
FIG. 1 is a block structural view of weight checker in accordance with an embodiment of the present invention.

A weight checker (weight checking apparatus) in accordance with an embodiment of the present invention is shown in FIG. 1. The weight checker 1 in FIG. 1 is provided near an end of a production line that produces items to be sold as, for example, food products. The weight checker 1 mainly includes a loading conveyor 2, a weighing conveyor 3, an allocating conveyor 4, a weighing portion 5, a loading sensor 6, and a controller 9.

The loading conveyor 2 receives items that are conveyed from an apparatus of preceding process in the production line. The loading conveyor 2 includes a belt conveyor 2a and a driving motor. The weighing conveyor 3 is disposed at a position subsequent to the loading conveyor 2 in the flow of items. The weighing conveyor 3 includes a belt conveyor 3a, and a driving motor. The allocating conveyor 4 is disposed at a position subsequent to the weighing conveyor 3 in the flow of items. The allocating conveyor 4 includes a belt conveyor 4a, a driving motor, and an allocating mechanism 4b. Here, an arm-type allocating mechanism 4b is utilized. However, other types of allocating mechanisms such as air jet type, fin type, drop flap type, and drop belt type can also be utilized. The weighing portion 5 includes a load cell, and measures the weight of the weighing conveyor 3. Here, the weight is measured every several hundred milliseconds. The measured weight data is sent to the controller 9. The loading sensor 6 is a sensor for detecting an item loaded from the loading conveyor 2 onto the weighing conveyor 3. The loading sensor 6 is a photoelectric sensor having a projector and a light receiver. The controller 9 controls the allocating mechanism 4b and driving motors that drive belt conveyors 2a, 3a, and 4a of various portions, based on data transmission from the weighing portion 5 and the loading sensor 6. This controller 9 includes a CPU, a ROM, a RAM, and a hard disk. An internal control program includes a weighing conveyor weight change monitoring means 9a and an item weight calculation means 9b (see FIG. 1). The weighing conveyor weight change monitoring means 9a is a program routine that monitors changes in the weight value data sent from the weighing portion 5. The item weight calculation means 9b is a program routine that calculates the weight of an item based on the weight value data sent from weighing portion 5. A liquid crystal display 11 and a warning issuing device 12 that buzzes a buzzer are connected to the controller 9.

Control of Weight Checker

Main Routine

Once an item is loaded from the loading conveyor 2 onto the weighing conveyor 3, the loading sensor 6 detects the loading of the item, and sends a detection signal to the controller 9. The controller 9 switches between the weighing conveyor weight change monitoring process and the item weight calculation process. As shown in Step S1 of the main routine, the loading sensor 6 first determines whether or not the loading sensor 6 is in a light shut-off state. The light shut-off state occurs when an item is passing between the projector and the light receiver of loading sensor 6 so that the light is shut off, if the loading sensor 6 is in the light shut-off state, the control proceeds to step S2, where the item weight calculation process is performed. If the loading sensor 6 is not in the light shut-off state (light-passing state), the control proceeds to step S3, where the weighing conveyor weight change monitoring process is performed.

Figure 3:
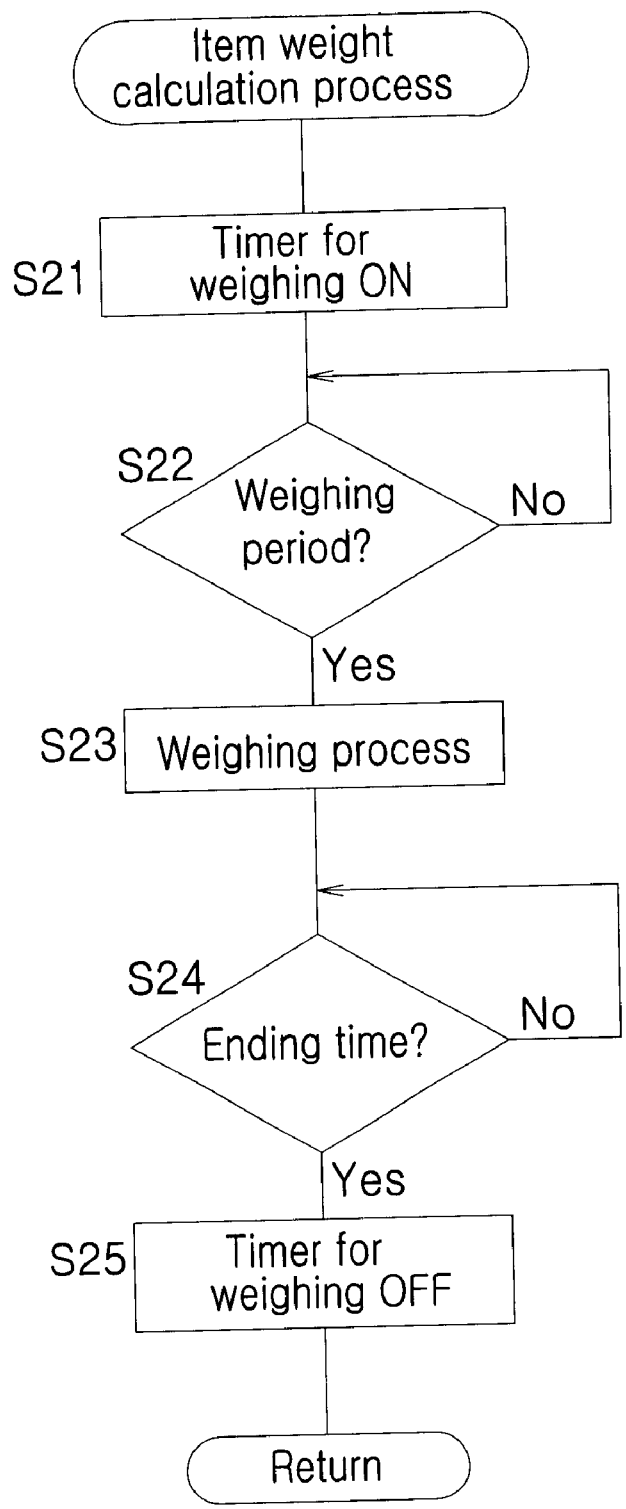
FIG. 3 is a view of a flow chart of the item weight calculation process of the weight checker of FIG. 1.

Item Weight Calculation Process FIG. 3 shows a control flow of the item weight calculation process. A timer for weighing is started first (step S21). Then, at step S22, it is determined whether the weighing period is in effect. The weighing period is set as a time period immediately prior to time t4 in FIG. 4, based on a conveyance speed of the item and the number of weighing per time period performed by weighing portion 5. During the weighing period, the item is completely loaded on the weighing conveyor 3, and a shock at the time of loading has faded out. Therefore, the weight value is stabilized. Referring to FIG. 3, the control does not proceed to step S23 until it is determined at step S22 that the weighing period has started. Once it is determined at step S22 that the weighing period has started, the control proceeds to step S23, and performs the weighing process. Here, the weight of the item is calculated by subtracting the weight of the weighing conveyor 3 with no item loaded thereon. The controller 9 sends a command to the allocating mechanism 4b to screen the item, based on the weight of the item calculated herein.

After the weighing process, the control proceeds to step S24, where it is determined whether an ending time has come. The ending time occurs when the item completely exits weighing conveyor 3, and the measured value of weight of the weight portion 5 becomes stable. At the ending time, the control proceeds to step S25 and stops the timer for calculation. The control returns to the main routine.

Figure 4:
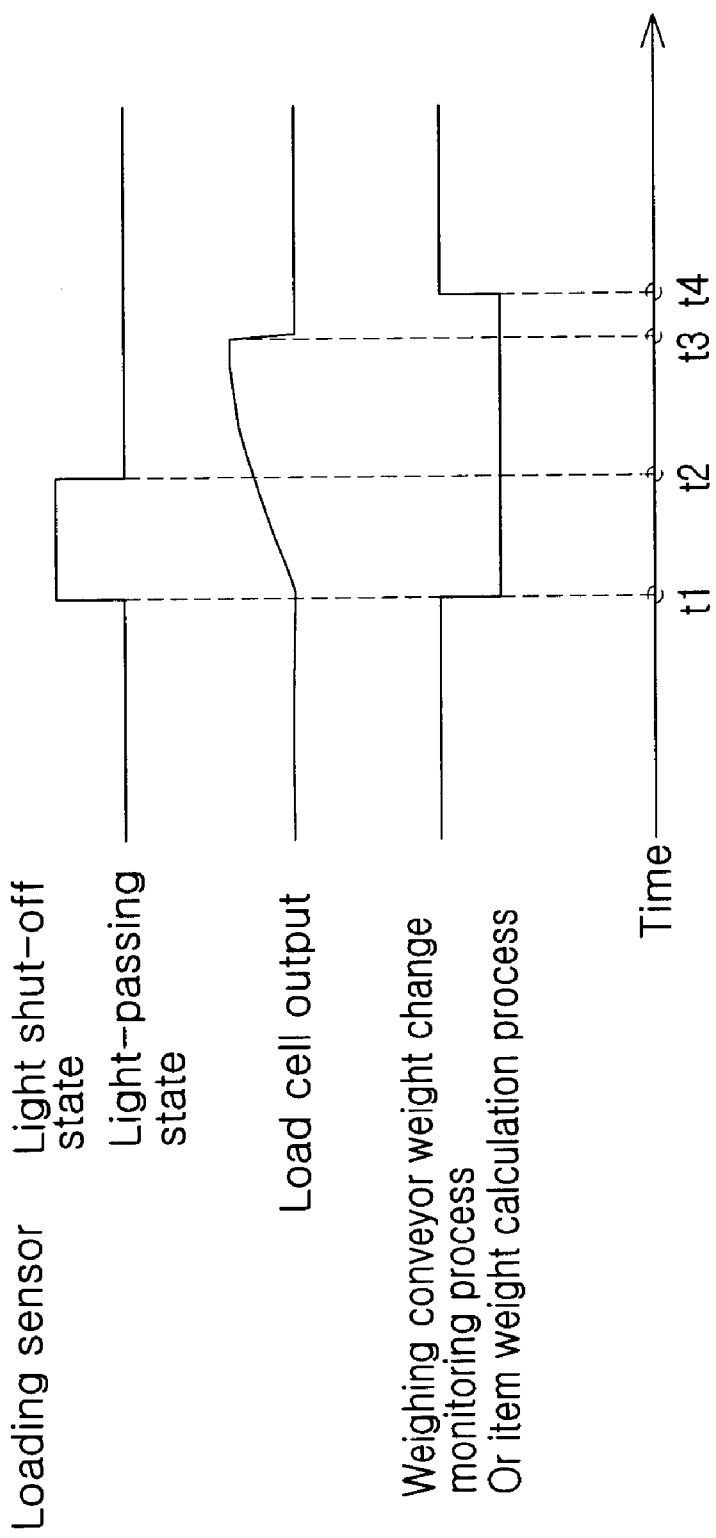
FIG. 4 is a view of a timing chart including the item weight calculation process of the weight checker of FIG. 1.

FIG. 4 shows a situation where the control shifts from the main routine to the subroutine of the item weight calculation process to calculate the weight of the item. As the item starts entering the weighing conveyor 3 and the loading sensor 6 enters the light shut-off state at time t1, the control switches from the weighing conveyor weight change monitor process, which will be described later, to the item weight calculation process shown as steps S1 and S2 in FIG. 2. Referring again to FIG. 4, as the item is loaded onto the weighing conveyor 3 at time t1, the measured value of the weighing portion (load cell) 5 increases. After the time t2, when the item is completely loaded onto weighing conveyor 3, the measured value becomes stable. Then, the calculation process is performed to calculate the weight of the item during the weighing period immediately prior to time t3, which is when the item exits from weighing conveyor 3. Thereafter, when the ending time t4 comes, the control returns to the main routine. Based on the light-passing condition of the loading sensor 6, the control switches to the weighing conveyor weight change monitoring process shown as steps S1 and S3 in FIG. 2.

Weighing Conveyor Weight Change Monitoring Process

Figure 5:
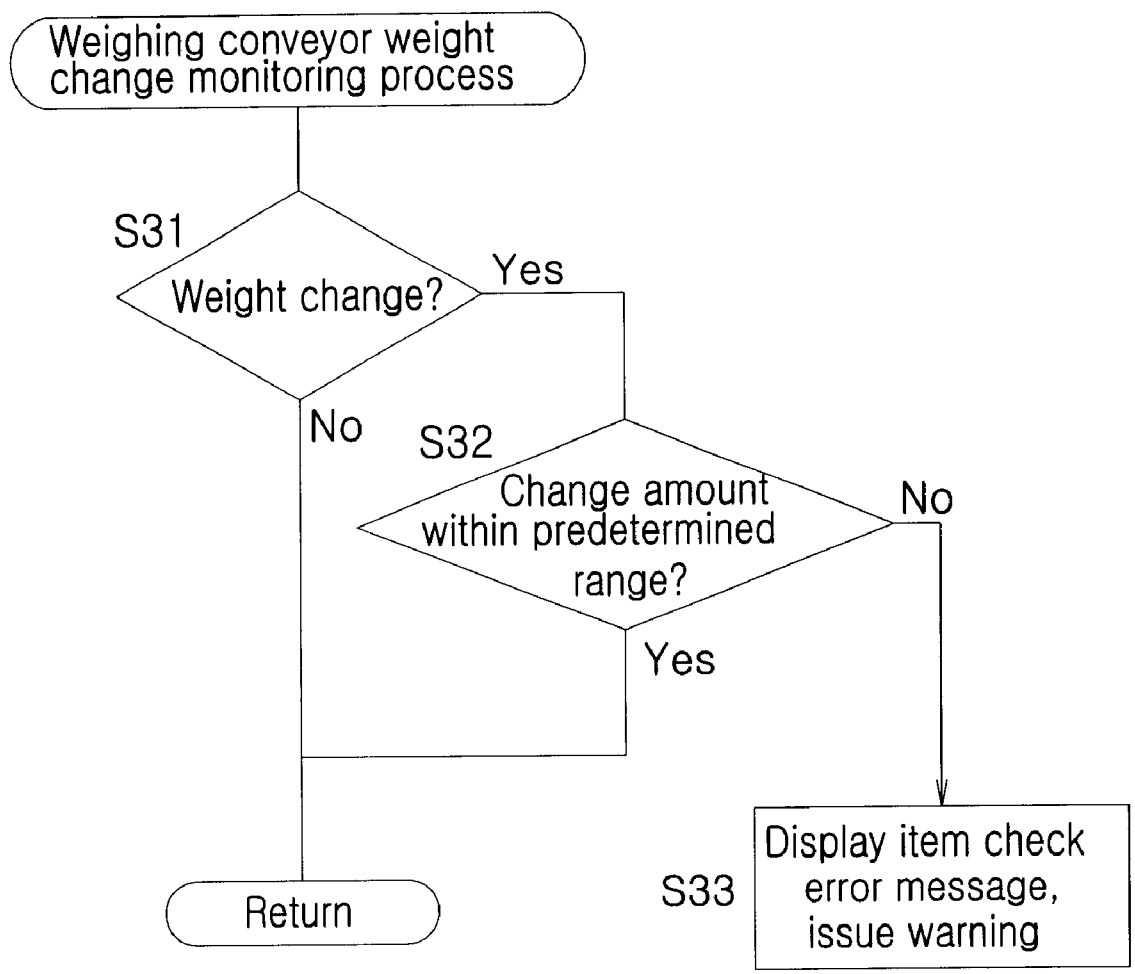
FIG. 5 is a view of a flow chart of weighing conveyor weight change monitoring process of the weight checker of FIG. 1.

FIG. 5 shows a control flow of the weighing conveyor weight change monitoring process. Here, in step S31, it is determined whether or not the weight value of weighing conveyor 3 sent from weighing portion 5 has changed. If it is determined that there has been no change, the control returns to the main routine.

If it is determined in step S31 that there has been a weight change, it is then determined whether the amount of change is within a predetermined range (step S32). The amount of change within the predetermined range is an amount of weight change due to wind, vibration, etc. that occurs from the conveyance with the weighing conveyor 3, or vibration in the factory where the production line is. The predetermined range of change is determined at the time of test-driving. If it is determined that the amount of change is within the predetermined range, the control returns to the main routine.

If it is determined at step S32 that the amount of change exceeds the predetermined range, the control shifts to step S33 to perform an error process. More specifically, a message such as, "Item check error" is displayed on a display 11, and the warning issuing device 12 buzzes the buzzer. Also during the error process, the operation of the weighing conveyor 3 is stopped, such that abnormal items that have not been detected by the loading sensor 6 are prevented from being conveyed to a subsequent process. Once the error process is performed in step S33, the operation cannot be resumed without resetting the weight checker 1.

Figure 2:
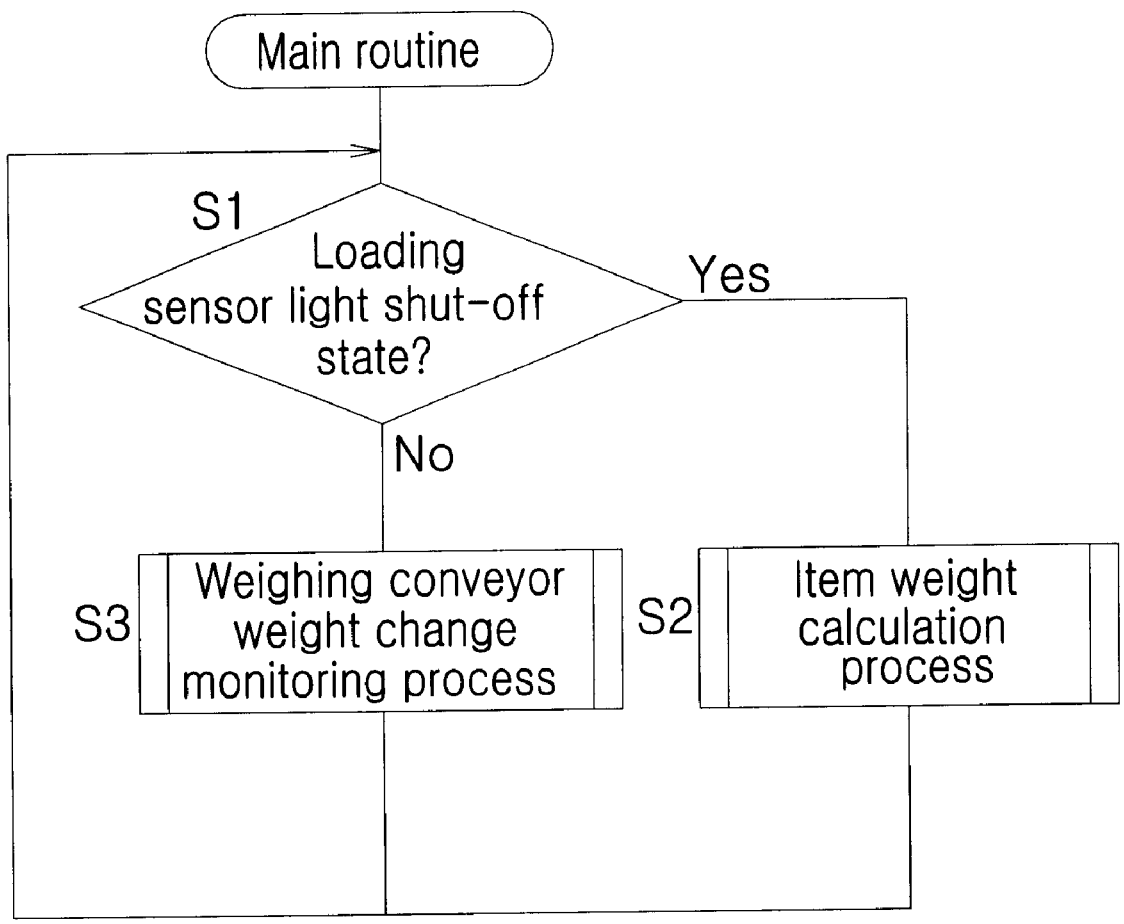
FIG. 2 is a view of a flow chart of the main routine of the weight checker of FIG. 1.
Figure 6:
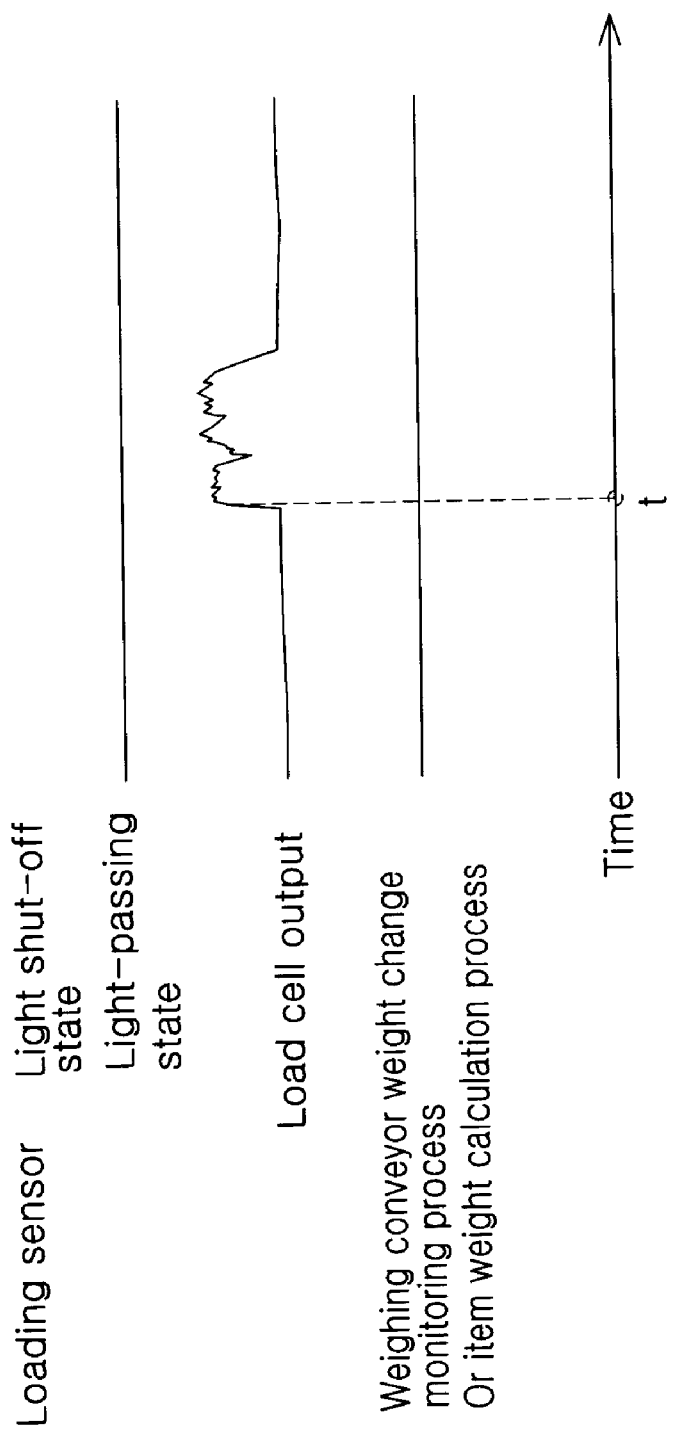
FIG. 6 is a view of a timing chart including the error process of the weighing conveyor weight change monitoring process of the weight checker of FIG. 1.

FIG. 6 shows a situation in which the error process (step S33) is performed during the weighing conveyor weight change monitoring process. The loading sensor 6 is in the light-passing state. Therefore, in the main routine, the control always proceeds from step S1 to the weighing conveyor weight change monitoring process in step S3, as shown in FIG. 2. In other words, as long as the loading sensor 6 is in the light-passing state, the control always proceeds to the weighing conveyor weight change monitoring process. Referring again to FIG. 6, if the measured value of the load cell (weighing portion 5) changes beyond the predetermined range (the state at time tin FIG. 6) because an object from outside the production line is loaded onto the weighing conveyor 3, or because an object is loaded onto the weighing conveyor 3 from the loading conveyor 2 without being detected by the loading sensor 6, the error process is performed. Accordingly, a warning is issued, and the operation of the weighing conveyor 3 is stopped.

Sensor Abnormality Detection Routine

Figure 7:
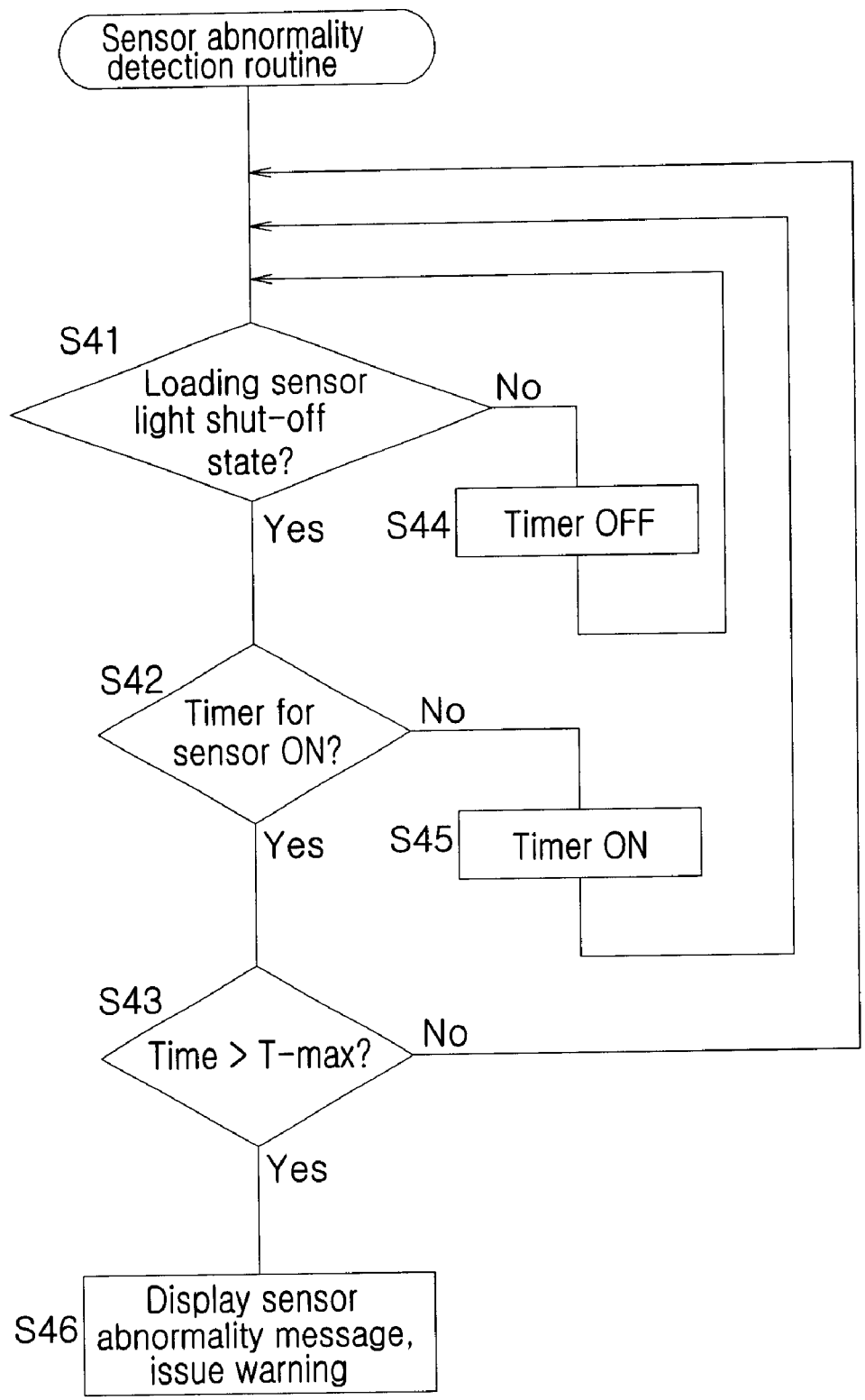
FIG. 7 is a view of a flow chart of the sensor abnormality detection routine of the weight checker of FIG. 1.

As shown in FIG. 7, in the control of weight checker 1, a sensor abnormality detection routine runs in parallel with the above-described main routine. When the loading sensor 6 stays in the light shut-off state due to malfunctioning or due to an incident that hinders the emission and receiving of lights of the loading sensor 6, these abnormalities are reported to the administrator or the operator of the production line as "sensor abnormality detected." In step S41, it is determined whether or not the loading sensor 6 is in the light shut-off state. If the loading sensor 6 is in the light shut-off state, the control proceeds to step S42, where it is determined whether or not the timer for the sensor is on. On the other hand, if the loading sensor 6 is in the light-passing state, the timer is stopped in step S44. If the timer is not on in step S42, the control proceeds to step S45 to start the timer on. If the timer is already on, the control proceeds to step S43, and determines whether or not the timer's time "Time" has exceeded the maximum allowable time T-max. The maximum allowable time T-max is determined based on the shape of the item and the conveyance speed of the item of the weighing conveyor 3. The maximum allowable time T-max corresponds to the maximum period of time during which a normal item would shut off the light between the projector and the light receiver of the loading sensor 6. If it is determined in step S43 that the timer's time "Time" has exceeded the maximum allowable T-max, the control proceeds to step S46 to perform an error process for the sensor abnormality. In this error process, a message "Sensor malfunctioning error" is displayed on the display 11, and the buzzer is buzzed by warning the issuing device 12. Also in this error process, the operation of the weighing conveyor 3 is stopped. Once the error process of step S46 is performed, the operation cannot be resumed unless the weight checker 1 is reset.

Figure 8:
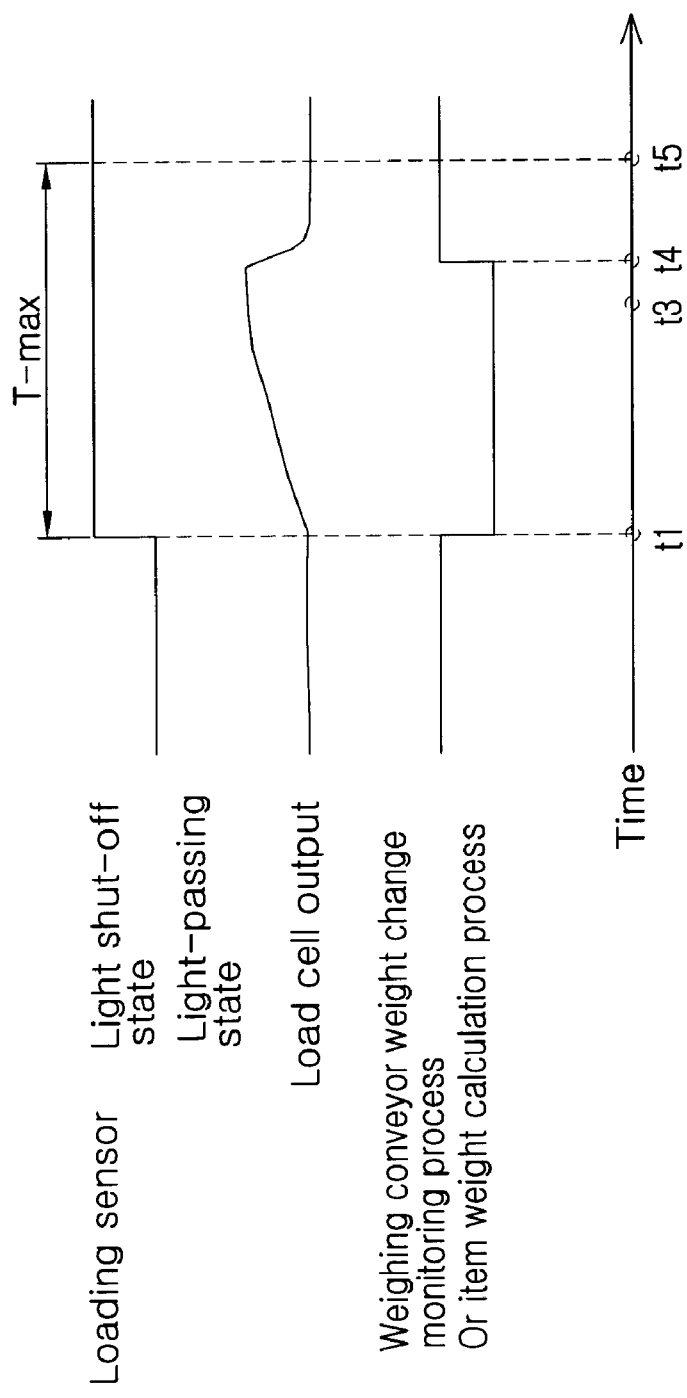
FIG. 8 is a view of a timing chart including the error process of the sensor abnormality detection routine of the weight checker of FIG. 1.
Figure 9:
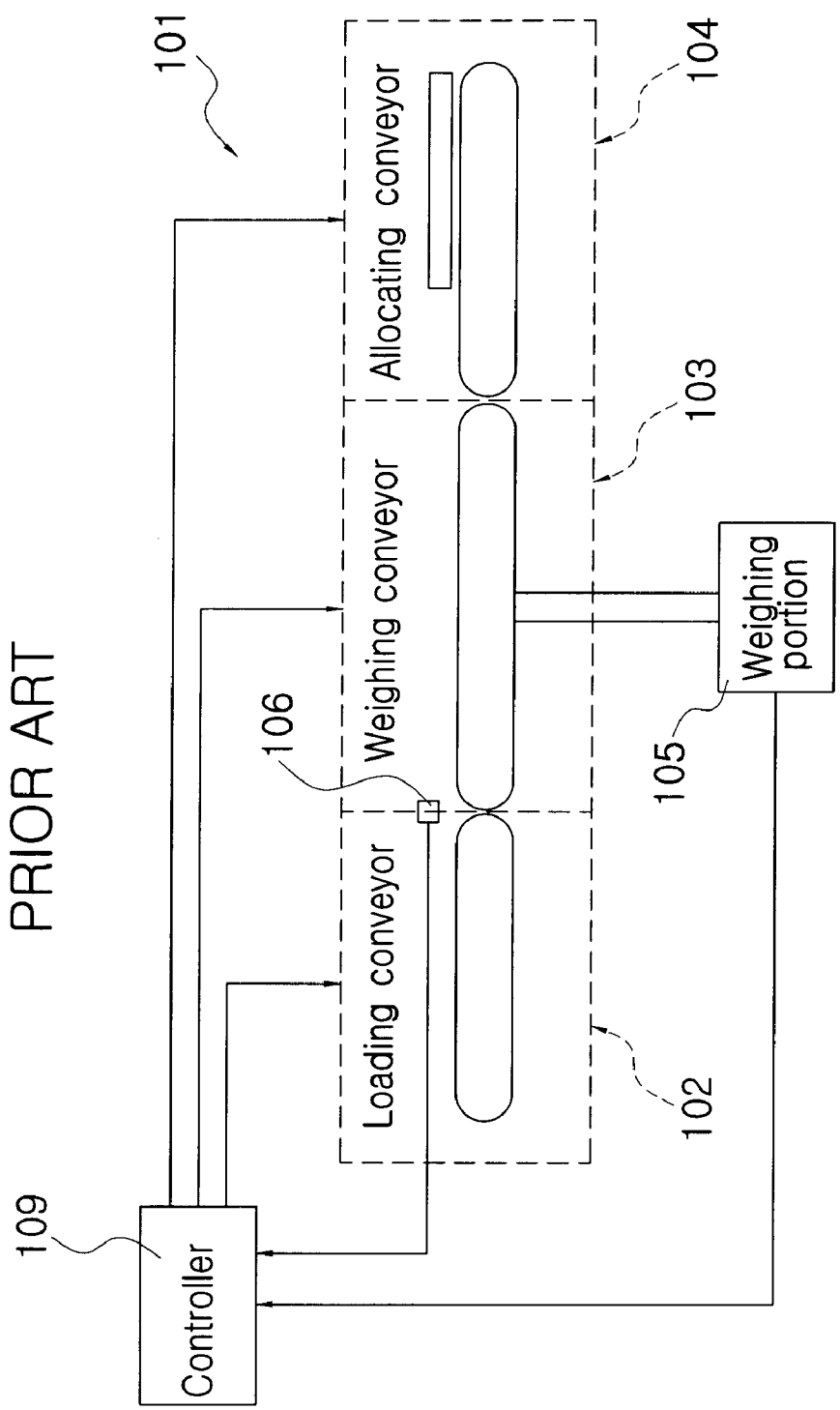
FIG. 9 is a block structural view of a conventional weight checking apparatus of the weight checker of FIG. 1.

FIG. 8 shows a situation in which the error process of step S46 is performed. The loading sensor 6 is in the light shut-off state at the time t1. The timer starts counting at the time t1. Although the loading sensor 6 normally returns to the light-passing state after the item passes as shown in FIG. 4, in the case shown in FIG. 8, the loading sensor 6 remains in the light shut-off state even after the time t5 passes and the timer's time "Time" exceeds the maximum allowable time T-max. In this case, it is determined that there is a malfunctioning in the loading sensor 6 itself or in the vicinity of the loading sensor 6. As a result, the error process of step S46 is performed. Accordingly, the warning is issued, and the operation of the weighing conveyor 3 is stopped.

Features of Weight Checker (1) In the weight checker 1 of the present embodiment, the weighing conveyor weight change monitoring process is performed until the loading sensor 6 detects the loading of an item in the weighing conveyor 3, while the process is switched to the item weight calculation process when the loading sensor 6 detects the loading of the item in the weighing conveyor 3. Then, once a period of time that is required to calculate the weight of the item elapses after the process has been switched to the item weight calculation process, the control switches back to the weighing conveyor weight change monitoring process. In other words, the weight checker 1 performs the weighing conveyor weight change monitoring process except when the item weight calculation process is performed based on the loading of the normal item into the weighing conveyor 3. Then, in the weighing conveyor weight change monitoring process, the weight change value of the weighing conveyor 3 due to a reason other than a normal item is detected as an error. Accordingly, the display process which displays a message "Item check error" on display 11 is performed, and the warning issuing device 12 is operated to caution the administrator of the production line. At the same time, the operation of the weighing conveyor 3 is stopped. Therefore, even when an item from outside the production line is loaded onto the weighing conveyor 3 due to a mistake of the operator, the weighing conveyor weight change monitoring process detects the change in the weight value of the weighing conveyor 3, such that the aforementioned error process is performed.

(2) In the weight checker 1 of the present embodiment, the error process (step S33 of FIG. 5) is performed when the change in the weight value of the weighing conveyor 3 exceeds the predetermined range. Therefore, while the change in the weight value of the weighing conveyor 3 is within the predetermined range, the error process is not performed. Accordingly, the present embodiment is advantageous for the weight checker 1 in which the weighing is performed while the item is conveyed by the conveyor, because the weight value changes constantly.

Alternate Embodiment

In the above-described embodiment, the weighing conveyor 3 is stopped during the error process (step S33 in FIG. 5) of the weighing conveyor weight change monitoring process. Instead of, or in addition to this arrangement, a command may be sent to the allocating mechanism 4b, such that an allocation is performed to prevent the item from being sent to a subsequent process from the weight checker 1. For instance, the item that has been sent to the allocating conveyor 4 after an error has occurred can be allocated to a separate location from where normal items are, or excluded from the normal production line along with items of which the weight value is outside the predetermined level.

Effects of the Invention

In the present invention, the weighing conveyor weight change monitoring process that monitors a change in the weight value of weighing conveyor detected by the weight detection means is performed except while the item weight calculation process is preformed based on the loading of a normal item onto the weighing conveyor. Therefore, it is possible to detect as an error a change in the weight value due to a reason other than a normal item. Accordingly, it is possible to avoid a problem wherein an item that has not been checked properly slips to the subsequent process.

The terms of degree such as "substantially", "about" and "approximately" as used herein mean a reasonable amount of deviation of the modified term such that the end result is not significantly changed. These terms should be construed as including a deviation of at least ±15% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A weight checking apparatus comprising:

a weighing conveyor for conveying an item;

a sensor configured to detect a loading of the item on said weighing conveyor;

weight detection means configured to detect a weight value of said weighing conveyor; and a controller having weight calculation means and weight change monitoring means and operatively coupled to said sensor and said weight detection means, said weight calculation means being for calculating a weight of the item based on the weight value detected by said weight detection means and capable of functioning when said sensor detects a loading of the item, said weighing conveyor weight change monitoring means being for monitoring a change in the weight value detected by said weight detection means and capable of functioning when said sensor does not detect a loading of the item.

2. The weight checking apparatus as set forth in claim 1, further comprising warning means that displays a screen or issues a warning, wherein said controller notifies of an abnormality through said warning means when said weighing conveyor weight change monitoring means shows a change in the weight value of said weighing conveyor that exceeds a predetermined range.

3. The weight checking apparatus as set forth in claim 2, wherein said controller stops said weighing conveyor when said weighing conveyor weight change monitoring means shows a change in the weight value of said weighing conveyor that exceeds a predetermined range.

4. The weight checking apparatus as set forth in claim 3, further comprising allocating means to allocate the item that exits from said weighing conveyor, based on the weight of the item calculated by said weight calculation means, wherein said controller sends a predetermined command of abnormality to said allocating means when said weighing conveyor weight change monitoring means shows a change in the weight value of said weighing conveyor that exceeds the predetermined range.

5. The weight checking apparatus as set forth in claim 4, wherein said controller activates said item weight calculation means in a period between the time when said sensor detects the loading of the item into said weighing conveyor and the time when the item exits said weighing conveyor.

6. The weight checking apparatus as set forth in claim 2, further comprising allocating means to allocate the item that exits from said weighing conveyor, based on the weight of the item calculated by said weight calculation means, wherein said controller sends a predetermined command of abnormality to said allocating means when said weighing conveyor weight change monitoring means shows a change in the weight value of said weighing conveyor that exceeds the predetermined range.

7. The weight checking apparatus as set forth in claim 6, wherein said controller activates said item weight calculation means in a period between the time when said sensor detects the loading of the item into said weighing conveyor and the time when the item exits said weighing conveyor.

8. The weight checking apparatus as set forth in claim 2, wherein said controller activates switches said item weight calculation means in a period between the time when said sensor detects the loading of the item into said weighing conveyor and the time when the item exits said weighing conveyor.

9. The weight checking apparatus as set forth in claim 3, wherein said controller activates said item weight calculation means in a period between the time when said sensor detects the loading of the item into said weighing conveyor and the time when the item exits said weighing conveyor.

10. The weight checking apparatus as set forth in claim 1, wherein said controller stops said weighing conveyor when said weighing conveyor weight change monitoring means shows a change in the weight value of said weighing conveyor that exceeds a predetermined range.

11. The weight checking apparatus as set forth in claim 10, further comprising allocating means to allocate the item that exits from said weighing conveyor, based on the weight of the item calculated by said weight calculation means, wherein said controller sends a predetermined command of abnormality to said allocating means when said weighing conveyor weight change monitoring means shows a change in the weight value of said weighing conveyor that exceeds the predetermined range.

12. The weight checking apparatus as set forth in claim 11, wherein said controller activates said item weight calculation means in a period between the time when said sensor detects the loading of the item into said weighing conveyor and the time when the item exits said weighing conveyor.

13. The weight checking apparatus as set forth in claim 10, wherein said controller activates said item weight calculation means in a period between the time when said sensor detects the loading of the item into said weighing conveyor and the time when the item exits said weighing conveyor.

14. The weight checking apparatus as set forth in claim 1, further comprising allocating means to allocate the item that exits from said weighing conveyor, based on the weight of the item calculated by said weight calculation means, wherein said controller sends a predetermined command of abnormality to said allocating means when said weighing conveyor weight change monitoring means shows a change in the weight value of said weighing conveyor that exceeds the predetermined range.

15. The weight checking apparatus as set forth in claim 14, wherein said controller activates said item weight calculation means in a period between the time when said sensor detects the loading of the item into said weighing conveyor and the time when the item exits said weighing conveyor.

16. The weight checking apparatus as set forth in claim 1, wherein said controller activates said item weight calculation means in a period between the time when said sensor detects the loading of the item into said weighing conveyor and the time when the item exits said weighing conveyor.

17. The weight checking apparatus as set forth in claim 16, wherein said controller activates said weighing conveyor weight change monitoring means at all times other than the period between the time when said sensor detects the loading of the item into said weighing conveyor and the time when the item exits said weighing conveyor.

* * * * *